(12) United States Patent
Sullivan et al.

(10) Patent No.: US 11,354,614 B2
(45) Date of Patent: Jun. 7, 2022

(54) SYSTEMS AND METHODS FOR PROVIDING INFORMATION RELATING TO PROFESSIONAL GROWTH

(75) Inventors: Daniel J. Sullivan, Toronto (CA); Barbara Sue Smith, Toronto (CA)

(73) Assignee: The Strategic Coach, Toronto (CA)

( * ) Notice: Subject to any disclaimer, the term of this patent is extended or adjusted under 35 U.S.C. 154(b) by 287 days.

(21) Appl. No.: 12/561,111

(22) Filed: Sep. 16, 2009

(65) Prior Publication Data

US 2011/0066475 A1     Mar. 17, 2011

(51) Int. Cl.
| | | |
|---|---|---|
| *G06Q 10/10* | (2012.01) | |
| *G06Q 10/06* | (2012.01) | |
| *G06Q 50/20* | (2012.01) | |

(52) U.S. Cl.
CPC ..... *G06Q 10/0637* (2013.01); *G06Q 50/2057* (2013.01); *G06Q 10/06398* (2013.01); *G06Q 10/1053* (2013.01)

(58) Field of Classification Search
CPC ......... G06Q 10/10–1097; G06Q 50/20; G06Q 50/205; G06Q 50/2057
USPC ........................................... 705/7.42
See application file for complete search history.

(56) References Cited

U.S. PATENT DOCUMENTS

| | | |
|---|---|---|
| 4,489,958 A | 12/1984 | Martin |
| 5,247,438 A | 9/1993 | Subas et al. |
| 5,263,158 A | 11/1993 | Janis |
| 5,388,198 A | 2/1995 | Layman et al. |
| 5,423,034 A | 6/1995 | Cohen-Levy et al. |
| 5,457,476 A | 10/1995 | Jenson |
| 5,579,478 A | 11/1996 | Heiserman et al. |
| 5,655,118 A | 8/1997 | Heindel et al. |
| 5,673,691 A | 10/1997 | Abrams et al. |
| 5,729,734 A | 3/1998 | Parker et al. |
| 5,729,745 A | 3/1998 | Reina et al. |
| 5,745,110 A | 4/1998 | Ertemalp |
| 5,758,083 A | 5/1998 | Singh et al. |
| 5,812,132 A | 9/1998 | Goldstein |
| 5,839,901 A | 11/1998 | Karkanen |
| 5,855,006 A | 12/1998 | Huemoeller et al. |
| 5,873,108 A | 2/1999 | Goyal et al. |

(Continued)

FOREIGN PATENT DOCUMENTS

| | | |
|---|---|---|
| CA | 2711875 | 2/2011 |
| CN | 1030809 C | 1/1996 |

(Continued)

OTHER PUBLICATIONS

"What are Relational Databases?" HowStuffWorks, Feb. 18, 2005, <https://computer.howstuffworks.com/question599.htm>. Internet Archive, <https://web.archive.org/web/20050218093457/https://computer.howstuffworks.com/question599.htm>. (Year: 2005).*

(Continued)

*Primary Examiner* — Romain Jeanty
(74) *Attorney, Agent, or Firm* — Carr & Ferrell LLP

(57) ABSTRACT

Systems and methods for providing information relating to professional growth are provided. A client provides client data regarding professional growth. The current level of professional growth of the client is determined, and the next level of professional growth is identified. The client is provided with information regarding the next level, based on the identification of the next level.

21 Claims, 12 Drawing Sheets

(56) References Cited

U.S. PATENT DOCUMENTS

| | | |
|---|---|---|
| 5,890,131 A | 3/1999 | Ebert et al. |
| 5,890,905 A | 4/1999 | Bergman |
| 5,907,490 A | 5/1999 | Oliver |
| 5,954,510 A * | 9/1999 | Merrill et al. ............... 434/236 |
| 5,978,648 A | 11/1999 | George et al. |
| 6,012,037 A | 1/2000 | Yoshikawa |
| 6,042,383 A | 3/2000 | Herron |
| 6,167,362 A | 12/2000 | Brown et al. |
| 6,308,164 B1 | 10/2001 | Nummelin et al. |
| 6,313,852 B1 | 11/2001 | Ishizaki et al. |
| 6,501,473 B1 | 12/2002 | Hayes et al. |
| 6,526,418 B1 | 2/2003 | Midgley et al. |
| 6,560,639 B1 | 5/2003 | Dan et al. |
| 6,854,088 B2 | 2/2005 | Massengale et al. |
| 7,774,220 B2 | 8/2010 | Sullivan et al. |
| 7,893,940 B2 | 2/2011 | Mitchell et al. |
| 7,983,940 B2 | 7/2011 | Hagmann et al. |
| 11,138,528 B2 | 10/2021 | Sullivan |
| 2001/0007976 A1 | 7/2001 | Thompson et al. |
| 2001/0032092 A1 | 10/2001 | Calver |
| 2002/0032574 A1 | 3/2002 | Lowrance et al. |
| 2002/0042731 A1* | 4/2002 | King, Jr. ............... G06Q 10/06 705/7.12 |
| 2002/0049751 A1 | 4/2002 | Chen et al. |
| 2002/0087476 A1 | 7/2002 | Salas et al. |
| 2002/0112153 A1 | 8/2002 | Wu et al. |
| 2002/0112612 A1 | 8/2002 | Cusenza et al. |
| 2002/0133502 A1 | 9/2002 | Rosenthal et al. |
| 2002/0194046 A1 | 12/2002 | Sullivan et al. |
| 2003/0009373 A1* | 1/2003 | Ensing ............... G06Q 10/0637 705/7.33 |
| 2003/0018519 A1* | 1/2003 | Balz ............... G06Q 10/063 703/6 |
| 2003/0033192 A1 | 2/2003 | Zyman et al. |
| 2003/0070157 A1* | 4/2003 | Adams ............... G06F 8/77 717/101 |
| 2003/0187725 A1* | 10/2003 | Jotkowitz ............... 705/11 |
| 2003/0217117 A1 | 11/2003 | Dan et al. |
| 2003/0222896 A1 | 12/2003 | Hagmann et al. |
| 2004/0010709 A1* | 1/2004 | Baudoin ............... G06Q 40/08 726/25 |
| 2004/0044702 A1 | 3/2004 | Ferreira Alves et al. |
| 2004/0054545 A1* | 3/2004 | Knight ............... G06Q 10/063 705/7.11 |
| 2004/0215503 A1 | 10/2004 | Allpress et al. |
| 2004/0236620 A1 | 11/2004 | Chauhan et al. |
| 2005/0065841 A1* | 3/2005 | Middleton ............... G06Q 10/0637 705/7.36 |
| 2005/0096973 A1* | 5/2005 | Heyse et al. ............... 705/11 |
| 2005/0171831 A1* | 8/2005 | Johnson ............... G06Q 10/0639 705/7.41 |
| 2005/0283499 A1 | 12/2005 | Fowler |
| 2006/0085455 A1* | 4/2006 | Chmura ............... G06Q 10/06 |
| 2006/0129419 A1* | 6/2006 | Flaxer ............... G06F 8/24 705/7.37 |
| 2007/0027827 A1 | 2/2007 | Balagaev |
| 2007/0061191 A1* | 3/2007 | Mehrotra ............... G06Q 10/06 705/7.36 |
| 2007/0112612 A1 | 5/2007 | Dollens |
| 2007/0203710 A1* | 8/2007 | Habichler et al. ............... 705/1 |
| 2009/0030711 A1* | 1/2009 | Puccio et al. ............... 705/1 |
| 2009/0037241 A1* | 2/2009 | Olsen et al. ............... 705/7 |
| 2009/0043630 A1 | 2/2009 | Knieper |
| 2009/0048957 A1* | 2/2009 | Celano ............... 705/35 |
| 2009/0177665 A1* | 7/2009 | Callery ............... G06Q 10/10 |
| 2010/0010880 A1* | 1/2010 | Toth ............... G06Q 10/10 705/7.38 |
| 2010/0082356 A1* | 4/2010 | Verma et al. ............... 705/1 |
| 2010/0100408 A1* | 4/2010 | Dion ............... 705/8 |
| 2010/0257107 A1 | 10/2010 | Sullivan et al. |
| 2010/0280935 A1* | 11/2010 | Fellowes et al. ............... 705/35 |
| 2011/0029353 A1 | 2/2011 | Sullivan |

FOREIGN PATENT DOCUMENTS

| | | |
|---|---|---|
| CN | 1223025 A | 7/1999 |
| WO | WO1993009499 A1 | 5/1993 |
| WO | WO9530959 A1 | 11/1995 |
| WO | WO9915989 A1 | 4/1999 |
| WO | WO9949615 A1 | 9/1999 |

OTHER PUBLICATIONS

Ibbs, C.W., Kwak, Y.H. "Assessing Project Management Maturity." Project Management Journal, vol. 31, is. 1, Mar. 2000, p. 32-43. (Year: 2000).*

Andersen, E.S., Jessen, S.A. "Project Maturity in Organisations." International Journal of Project Management, vol. 21, is. 6, Aug. 2003, p. 457-461. (Year: 2003).*

"Machine learning." A Dictionary of Computing, 6 ed., edited by John Daintith and Edmund Wright, Oxford University Press, 2008. (Year: 2008).*

Goal Pro. "Success Studios Goal Pro 5.0" Jun. 2000, downloaded from web.archive.org/www.goalpro.com [retrieved on Dec. 15, 2006).

Sullivan, Daniel, "The Strategy Circle", The Strategic Coach, publication date unknown.

Sullivan, Daniel, "The Secrets of Success", CMA Magazine, Sep. 1998, vol. 72, No. 7, p. 22-25.

Sullivan, Daniel, "New economic rules call for 'personal focus" National Underwrite Life, Jul. 2, 1991, n 27A, p. 13 (2).

Sullivan, Daniel, "Breaking through the ceiling of complexity". Life and health Insurance Sales, Jul. 1994, v137n7, p. 4-15.

Left, Michelle R., "The checkbook mentor" Life Association News, May 1998, v93n5, p. 8-96.

Morrow, Edwin P., "Asset Enhancement" Journal of Financial Planning, Apr. 1998, v11n2, p. 100-102.

The Strategic Coach, Inc., Where the Best Get Better downloaded from web.archive.orgtwww.strategiccoach.com [retrieved Dec. 14, 2006).

The Strategic Coach, Inc., "Welcome to the Strategic Coach" (Nov. 27, 1999) home page of strategiccoach.com, downloaded from http://web.archive.org/web/19991112194745/www.strategiccoach.com/KPhome.htm [retrieved Jul. 6, 2008], 4 pages.

The Strategic Coach, Inc., "FAQs" (Jun. 1999) support page of strategiccoach.com, downloaded from http://web.archive.org/web/19991113040218/www.strategiccoach.com/software.htm [retrieved Jul. 6, 2008], 14 pages.

The Strategic Circle/Strategic Coach Program (1983-1997) U.S. Appl. No. 10/163,167 Artifact 10163637ZA, selected p. 5.

Avantos. "Avantos ManagePro 3.1", originally publication date unknown, downloaded from www.foremost-systems.com [retrieved Dec. 15, 2006).

Lifeplan. "Lifeplan—plan and live an excellent life!" as of Jun. 30, 1999, downloaded from web.archive.org/www.mindtools.com [retrieved Dec. 15, 2006).

Fulton, Jennifer. Easy Microsoft Outlook 97. Que: 1997, p. 156-158, 209-211.

McClure, David. "Goal-setting MBA Ware ideal for busy project managers," ORMS, Feb. 1996, vol. 23, No. 1, downloaded from www.lionhrtpub.com/orms [retrieved Jan. 4, 2007).

Russell Borland, Running Microsoft Outlook 97, Microsoft Press, Jun. 25, 1997, Chapter 8.

Claudia Willen, TheABCs of Outlook 97, Sybex Inc.,Mar. 17, 1997, Chapters 8-14.

Non-Final, Jun. 17, 2014, U.S. Appl. No. 12/534,783, filed Aug. 3, 2009.

Non-Final, Oct. 21, 2014, U.S. Appl. No. 12/534,783, filed Aug. 3, 2009.

Non-Final Office Action, dated Jan. 11, 2016, U.S. Appl. No. 12/561,111, filed Sep. 16, 2009.

Non-Final Office Action, filed Dec. 3, 2015, U.S. Appl. No. 12/641,000, filed Dec. 17, 2009.

Office Action dated Nov. 13, 2015 in Canada Application No. 2713371, filed Aug. 19, 2010.

(56) References Cited

OTHER PUBLICATIONS

Office Action dated Jan. 27, 2016 in Canada Application No. 2711875, filed Aug. 2, 2010.
Final Office Action, dated Jun. 2, 2016, U.S. Appl. No. 12/534,783, filed Aug. 3, 2009.
Final Office Action, dated Jun. 13, 2016, U.S. Appl. No. 12/641,000, filed Dec. 17, 2009.
Non-Final Office Action, dated Oct. 19, 2016, U.S. Appl. No. 12/534,783, filed Aug. 3, 2009.
Uffelman, Jonathan, "A Practitioner's Guide to Section 101 Invalidity: Analyzing Abstract Concepts in the Wake of *Alice* v. *CLS Bank*", Patent, Trademark & Copyright Journal, ISSN 0148-7965, May 29, 2015, pp. 1-12.
Office Action dated Jan. 27, 2016 in Canada Application No. 2711875, filed Aug. 2, 2010, 7 pages.
Final Office Action, dated May 2, 2017, U.S. Appl. No. 12/534,783, filed Aug. 3, 2009.
"Office Action," Canada Patent Application No. 2713371, dated Apr. 28, 2017, 8 pages.
Office Action dated Aug. 26, 2014 in Canada Application No. 2711875, filed Aug. 2, 2010.
Final, Aug. 23, 2013, U.S. Appl. No. 12/641,000, filed Dec. 17, 2009.
Final, Nov. 13, 2013, U.S. Appl. No. 12/641,000, filed Dec. 17, 2009.
Office Action dated Sep. 23, 2014 in Canada Application No. 2713371, filed Aug. 19, 2010.
Notice of Allowance, dated Dec. 29, 2009, U.S. Appl. No. 10/163,637, filed Jun. 7, 2002.
Final, Jul. 31, 2012, U.S. Appl. No. 12/534,783, filed Aug. 3, 2009.
Non-Final, Aug. 16, 2012, U.S. Appl. No. 12/641,000, filed Dec. 17, 2009.
"Office Action," Canada Patent Application No. 2711875, dated May 16, 2017, 8 pages.
Advisory Action, dated Sep. 16, 2016, U.S. Appl. No. 12/641,000, filed Dec. 17, 2009.
"Pre-Appeal Review," Canada Patent Application No. 2711875, May 4, 2018, 5 pages.
"Office Action," Canada Patent Application No. 2713371, dated Aug. 13, 2018, 8 pages.
"Office Action," dated May 2, 2017 in U.S. Appl. No. 12/534,783, filed Aug. 3, 2009, 22 pages.
"Pre-Appeal Review," Canada Patent Application No. 2711875, Feb. 6, 2020, 18 pages.
Grundy, Tony, "Strategy Implementation and Project Management", International Journal of Project Management, vol. 16, No. 1, 1998, pp. 43-50.
"Office Action", Canada Patent Application No. 2711875, dated Aug. 6, 2020, 36 pages.
"Office Action", Canada Patent Application No. 3108155, dated Jan. 24, 2022, 3 pages.

\* cited by examiner

| Level | Result | Name | Summary | Strengths | Dangers | Opportunities |
|---|---|---|---|---|---|---|
| 7 | MONOPOLY | Value Creation Monopoly | You are the master of your game and your future. Being an entrepreneur is a pure pleasure, and your future, both business and personal, is always becoming much bigger than your past. | - Clients/customers shut off possibility of competitive approaches or offers.<br>- Would-be competitors cannot comprehend or copy your value creation.<br>- Everything focused on developing and expanding the Value Creation Monopoly. | - Complacency because business seems easy and predictable.<br>- Losing touch with the emerging D.O.S. issues of clientele.<br>- Not strengthening the crucial components of the Value Creation Monopoly. | - Increasing complexity in society leads to greater value creation.<br>- Increased commoditization drives more clients to your process.<br>- Your business model becomes the foundation for entirely new industry. |
| 6 | DOMINATION | Intellectual Capital Company | Everybody is interested in what you are doing, and great people want to work with you. Opportunities abound. Your packaged ideas have a growing audience of fans and admirers. | - Increased income from your uniquely packaged creativity and wisdom.<br>- Increasingly seen as an industry leader and transformer.<br>- Dramatic jump in attracting new clientele and talent for your team. | - Unwillingness to hire an on-staff graphic artist and writer.<br>- Carelessness about legally protecting packaged creativity.<br>- Creating Intellectual Capital that doesn't reinforce Unique Process. | - All income comes from your own packaged Intellectual Capital.<br>- Your reputation and influence become nation and global.<br>- Former competitors now want to be students and customers. |
| 5 | INNOVATION | Unique Process Company | All of a sudden, the complexities disappear. Everything about your business is now simpler and more exciting. You now know how to win the cash flow game on a permanent basis. | - Clients become creative partners.<br>- New income stream that is free from commoditization and regulation.<br>- Continual increases in productivity, profitability, and preparation time. | - Failure to package the Unique Process so that it's "official."<br>- Unwillingness to reorganize your business around the process.<br>- Fear of asking for upfront payment from prospects and clientele. | - Competitors are increasingly curious, envious, and worried.<br>- Entire organization is a single Unique Process with many dimensions.<br>- Ability to link up with other entrepreneurs with |

FIG. 4A

| | | | 440 | 450 | 460 | 470 |
|---|---|---|---|---|---|---|
| 4 | DIFFERENTIATION | D.O.S.-Based Commodity Company | You have an extraordinary competitive advantage in every client relationship. Your marketing results go up as your marketing costs go down. | - Immediate differentiation from competition in the minds of all prospects and clientele.<br>- Access to information about clientele that no competitor can match.<br>- Dramatic shortening of selling cycle. | - Fear of asking an open-ended question that you can't control<br>- Not using the D.O.S. information to build a foundation for relationship.<br>- Still trying to sell a commodity rather than a transformed future. | - Number of high-quality referrals increases dramatically.<br>- Best clientele relationships are long-lasting and increasingly lucrative.<br>- Competitors are increasingly mystified by your sales success. |
| 3 | PROFITABILITY | Largest Cheque Commodity Company | Now you have the formula for continual growth within a commoditized marketplace. You are continually updating your organization and operating in a more strategic fashion. | - Continual increase in quality and value of clientele.<br>- Continual updating of support team and organizational resources.<br>- Elimination of unprofitable activities and relationships. | - Unwillingness to free yourself from non-productive clientele.<br>- Unwillingness to replace staff members who don't want to grow.<br>- You lack personal goals to achieve revenues and profits. | - The ability to grow business ten times in ten years.<br>- Increased reputation as a major player in your marketplace/industry.<br>- You are always focused on the most productive and profitable situations. |
| 2 | PRODUCTIVITY | Unique Ability Commodity Company | Your life as an entrepreneur immediately becomes more productive, profitable, and enjoyable. But your revenues are still tied to an unpredictable commodity. | - Increased cooperation and creativity among team members.<br>- Increased personal productivity and profitability.<br>- Confidence about increased growth and success. | - Rugged Individualism: refusal to give up control of less productive activities and responsibilities.<br>- Loss of key people with great abilities who are crucial to future growth.<br>- You don't play a bigger game. | - Extraordinary teamwork and continual growth.<br>- Increased time and resources for planning and innovation.<br>- 90 to 100% of your time spent working on what you love. |
| 1 | CAPTIVITY | Commodity Trap Company | Never-ending build-up of complexity, unpredictability, and stress. Unless you are huge, global, and a public company, it is increasingly difficult to win at this game for very long. | - Personal striving for independence.<br>- Willingness to work hard and long for your personal improvement.<br>- Personal persistence in the fact of increasing competition and unpredictable change in | - Increased complexity and complications in every part of business.<br>- Decreasing profit margins, longer hours, and less satisfying work.<br>- Increasing difficulty in attracting, growing, and keeping good staff. | - Discovering or creating a new commodity that is highly profitable for as long a period as possible.<br>- Constantly increasing scope and scale of your commodity sales to offset low profit margins. |

FIG. 4B

Score:

| Level | Name | Description | Scoring (1-10) | What's Working? | What's Not? | Progress: Next 90 Days |
|---|---|---|---|---|---|---|
| 7 | Value Creation Monopoly | You achieve a competition-free zone that becomes permanent through the continual development and expansion of a uniquely positive experience for your clientele. | | | | |
| 6 | Intellectual Capital Company | You continually reinforce the power of your Unique Process with new Intellectual Capital packages that transform your clients' lives in uniquely positive ways. | | | | |
| 5 | Unique Process Company | You utilize the evolving D.O.S. information to organize your value creation for all clientele within a multi-staged process of decision-making and action. | | | | |
| 4 | D.O.S.-Based Commodity Company | You base and develop all of your client/customer relationships on the emerging results of The R-Factor Question and The D.O.S. Worksheet. | | | | |
| 3 | Largest Cheque Commodity Company | You continually improve your personal and organizational capabilities by focusing on bigger and better average results and rewards from individual clients and customers. | | | | |
| 2 | Unique Ability Commodity Company | You increasingly focus your personal and organizational time and efforts on those activities where there is superior skill, passion, energy, and never-ending improvement. | | | | |
| 1 | Commodity Trap Company | You continually break through your Ceiling of Complexity – and escape from commoditization – by increasing your personal and organizational productivity and profitability. | | | | |

SYSTEMS AND METHODS FOR PROVIDING INFORMATION RELATING TO PROFESSIONAL GROWTH

SUMMARY

Exemplary systems and methods for providing information relating to professional growth are provided. A client provides client data regarding professional growth. The current level of professional growth of the client is determined, and the next level of professional growth is identified. The client is provided with information regarding the next level, based on the identification of the next level.

Embodiments include methods for providing information relating to professional growth. Such methods may include receiving client data regarding professional growth of a client, determining a current level of professional growth of the client, based on the received client data, identifying a next level of professional growth for the client, based on the determination of the current level, and providing the client with information regarding the next level, based on the identification of the next level. The client data may be received from one or more data sources. For instance, the client data regarding professional growth of a client may be received from a relational database coupled to the processor. The client data regarding professional growth may be received from a scorecard where the client self-evaluated his or her professional growth. Also, the client data regarding professional growth may be objectively calculated and provided as a statistical measurement of the client's professional growth, based on the current level of the client and one or more prior levels that were obtained by the client.

Methods may further include providing the client with strategies on how to measurably progress from the current level to the next level. The strategies may be provided through a user interface online. The strategies may be custom-tailored to the client by a variety of factors. For instance, the strategies for professional growth may be custom-tailored in view of the client's personal strengths and weaknesses. The strategies may be determined by the strategy module, which is described later herein.

Exemplary methods may include providing to the client one or more professional growth tools. Such professional growth tools may be configured to assist the client in obtaining the next level of professional growth. Exemplary professional growth tools may include one or more calculators configured to measure current client data relating to the professional growth of a client. The information derived from the one or more calculators may then be used as a data source for the exemplary methods for providing information relating to professional growth of the client, as described herein.

Further embodiments include systems for managing professional development. Such systems may include a memory configured to store client information regarding professional growth of the client, a processor executable to determine a current level of professional growth of the client, based on the received client data and identify a next level of professional growth for the client, and an interface configured to provide the client with information regarding the next level.

Systems may further include one or more exemplary modules, such as the strategy module, a historical overview module, a professional growth tool module, and a statistics module, and a relational database module. More information about each of these modules will be provided later herein. Each of these modules may be used separately or in combination with each other in a particular program.

Embodiments of the present invention may yet further include computer-readable storage media, having embodied thereon programs for executing one or more exemplary methods for providing information relating to professional growth.

BRIEF DESCRIPTION OF THE DRAWINGS

FIGS. 4A and 4B illustrate an exemplary professional growth ladder that provides information regarding professional growth to systems and methods described herein.

FIG. 5 illustrates an exemplary scorecard by which a client may be scored on professional growth.

FIGS. 6-10 illustrate exemplary screenshots of an exemplary software program that incorporate various embodiments.

DETAILED DESCRIPTION

Embodiments of the present invention provide systems and methods for providing information relating to professional growth are provided. A client provides client data regarding professional growth. The current level of professional growth of the client is determined, and the next level of professional growth is identified. The client is provided with information regarding the next level, based on the identification of the next level. Interactive professional growth tools and strategies may also be provided to the client.

Figure 1:
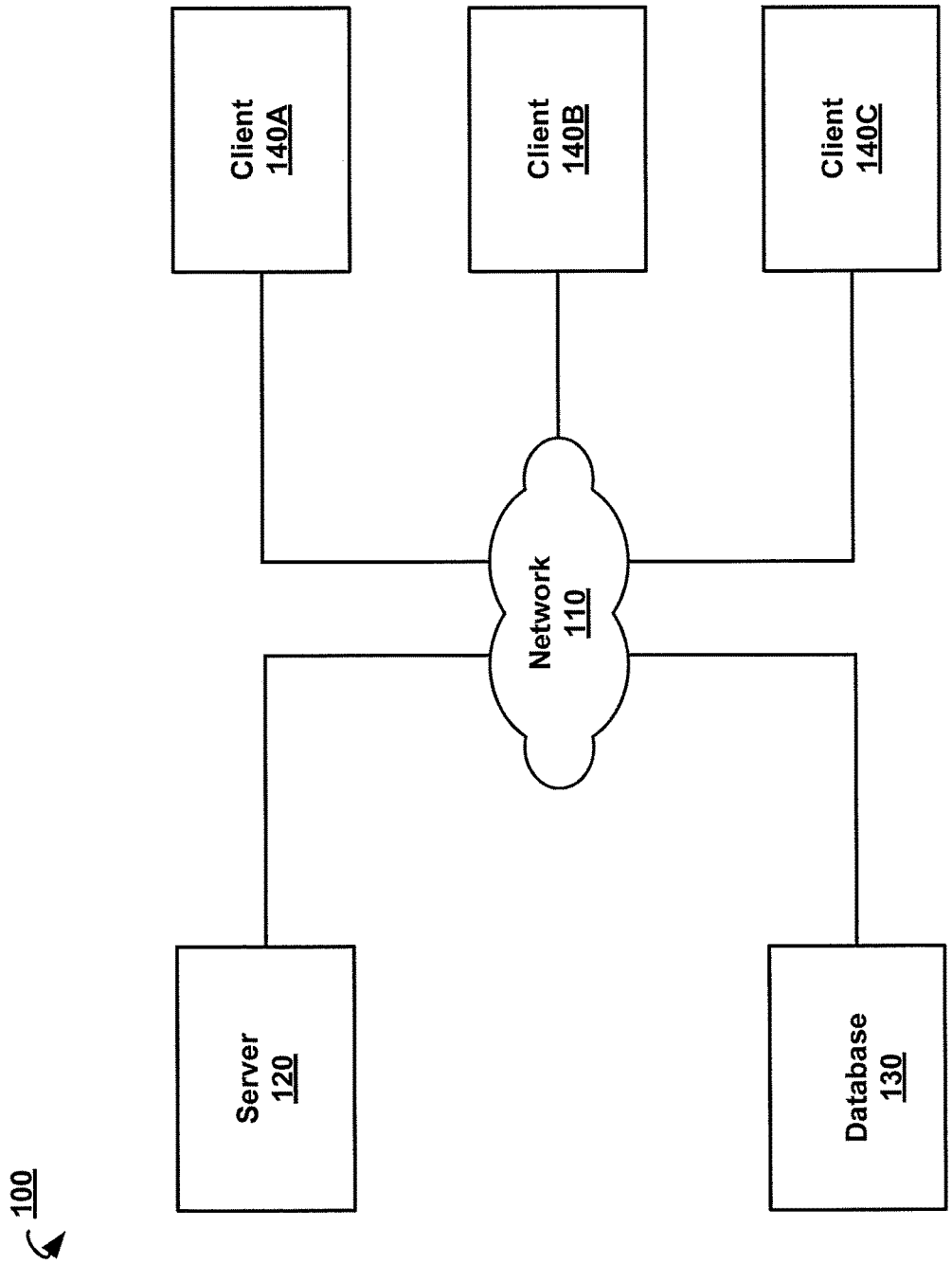
FIG. 1 is a diagram of an exemplary computing environment in which an exemplary system providing information regarding professional growth may be practiced.

FIG. 1 is a diagram of an exemplary computing environment 100 in which an exemplary system for providing information relating to professional growth may be practiced. The environment 100 comprises a computing network 110, a server 120, an optional database 130, and clients 140A-C. The server 120, the database 130, and clients 140A-C may each comprise one or more computing devices. A computing device may include a desktop computer, a laptop computer, a server, a handheld computer, a smartphone, a personal digital assistant, etc. All the figures provided herein are exemplary only. Also, like numbered elements in figures refer to like elements.

Network 110 may be a local, proprietary network (e.g., intranet) and/or may be a part of a larger wide-area network. For example, the network 110 may be a local area network (LAN), which may also be communicatively coupled to a wide Area network (WAN) such as the Internet. Network 110 allows for communication between the various components of system 100.

The server 120 (described in further detail with respect to FIG. 2) may communicate with one or more clients 140A-C via their computing devices over network 110. Clients 140A-C that are interested in obtaining information relating to professional growth may request and obtain the information via their interaction with the server 120. Such clients 140A-C may provide current or past information relating to the professional growth of the clients 140A-C. Upon receipt of such information, the server 120 may determine the client's current level of professional growth. The server 120 may identify the client's next level of professional growth.

Environment 100 may further include an optional database 130. The database 130 may include a relational database that may store one or more data entries received from one or more data sources. Exemplary embodiments of the relational database include a relational database that may determine explicit and/or implicit associations among data entries regarding one or more clients 140A-C. That is, the relational database may obtain data entries from a variety of data sources, determine associations of data entries regarding a client, and then provide these data entries automatically to exemplary systems for providing information relating to professional growth, as described herein.

The database 130 may be housed with the server 120 or, as illustrated, in a separate device. The database 130 serves as a repository for storing any kind of training materials (i.e., literature, exercises, video and/or audio clips or segments, games, scorecards, calculators, online tools, coaching presentations, coaching strategies, evaluations, lecture notes, professional growth tools, web links to further resources, powerpoint presentations, electronic mail messages, surveys, recommendations, and the like). Some professional development programs for certain clients may incorporate such training materials, which may be accessed and provided to the client from the database 130. The training materials may be provided to the client online the network 110.

Client devices may comprise any combination of computer hardware and software configured to receive and transmit information over the network 110, thereby communicating with the server 120 and/or the database 130.

Figure 2:
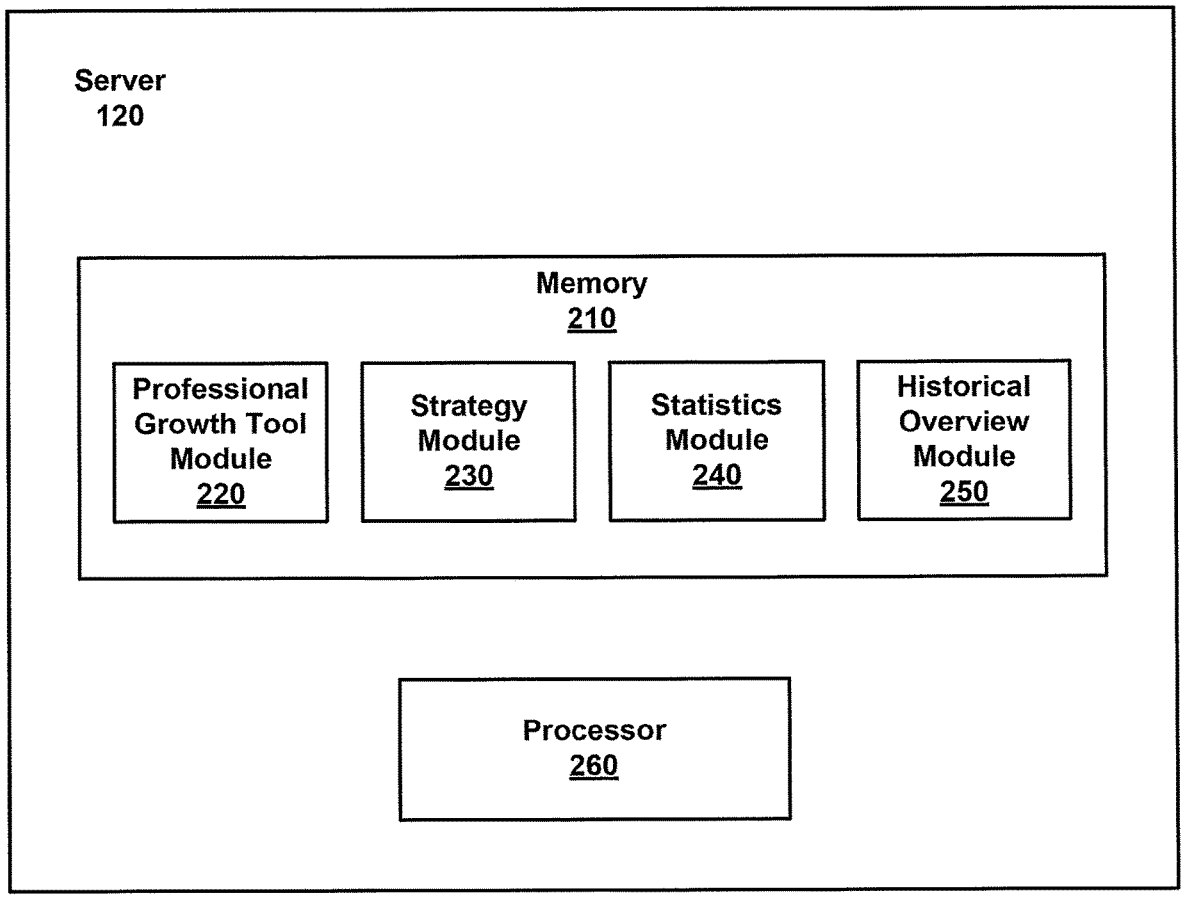
FIG. 2 is a block diagram of an exemplary professional growth server.

FIG. 2 is a block diagram of an exemplary server 120. The server 120 may include a memory 210, which may store one or more modules. Exemplary modules which may be stored in the memory 210 include a professional growth tool module 220, a strategy module 230, a statistics module 240, and a historical overview module 250. It will be appreciated by one skilled in the art that the technology described herein encompasses those embodiments where one or more of the modules may be combined with each other or not included in the memory 210 at all. The server 120 may further include a processor 260 for executing various instructions and modules stored in memory 210.

A module (or application), as referenced in the present invention, should be generally understood as a collection of routines that perform various system-level functions and may be dynamically loaded and unloaded by hardware and device drivers as required. The modular software components described herein may also be incorporated as part of a larger software platform or integrated as part of an application specific component.

The professional growth tool module 220 is configured to supply one or more professional growth tools to the client. The professional growth tools themselves are configured to assist the client in obtaining a next level of professional growth. As will be described in greater detail later herein, a current level of professional growth of a client is determined based on received client data regarding professional growth. This received client data may be received from one or more data sources (including but not limited to the client). Once the current level of professional growth is established, then the professional growth tool module 220 may recommend one or more professional growth tools to the client. In various embodiments, the professional growth tool module 220 may generate one or more professional growth tools to the client, utilizing one or more templates stored in the database 130. In exemplary embodiments, each level of professional growth is associated with at least one professional growth tool. In some embodiments, the professional growth tool may be provided to the client via the network 110 through a web browser (not shown). In other words, the professional growth tool may be furnished to the client online.

The professional growth tool module 220 is executable by the processor 260 to determine which of the professional growth tools available should be provided to the client. Client data (such as strengths, weaknesses, goals, aspiration, obstacles, and the like) may be provided to the professional growth tool module 220. The client data may be provided to the professional growth tool module 220 by the relational database described earlier.

Based on such client data, the professional growth tool module 220 may be configured to assist the client in obtaining the next level of professional growth. The next level of professional growth is any level beyond the current level of professional growth of the client. Exemplary professional growth tools may include one or more calculators configured to measure current client data relating to the professional growth of a client. The information derived from the one or more calculators may then be used as a data source for the exemplary methods for providing information relating to professional growth of the client, as described herein. Exemplary calculators include the focus day calculator, the intellectual capital calculator, entrepreneur time calculator, and the largest check calculator, which are described in U.S. patent application Ser. No. 12/534,783, filed on Aug. 3, 2009, titled "Managing Professional Development," which is hereby incorporated by reference in its entirety.

Further exemplary professional growth tools include or may incorporate one or more templates and/or training materials that are stored with the database 130 (such as literature, exercises, video and/or audio clips or segments, games, scorecards, calculators, online tools, coaching presentations, coaching strategies, web links to further resources, evaluations, lecture notes, powerpoint presentations, electronic mail messages, surveys, recommendations, and the like). One skilled in the art will appreciate that the one or more professional growth tools provided to the client may be repeated and/or slightly enhanced as the client moves up level by level. For instance, a calculator may be furnished to the client at a first level. Then, as the client moves to the second level, the same calculator may be furnished to the client, with enhanced features for a more robust utility. Alternatively, the calculator may be supplied to the client, combined with a new professional growth tool. In some embodiments, the professional growth tool module 220 may customize one or more professional growth tools for the client based on client data of professional growth. Exemplary embodiments of the professional growth tool module 220 may include an enforcement mechanism, such that the client must interact with the one or more professional growth tools recommended by the professional growth tool module 220 before the client may advance to the next level of professional growth.

The strategy module 230 is configured to provide strategies on how to measurably progress from the current level to the next level of professional growth to the client. The strategies may be provided through a user interface online. The strategies may be custom-tailored to the client by a variety of factors. For instance, the strategies for professional growth may be custom-tailored in view of the client's personal strengths and weaknesses. The strategies may also be customized to obstacles that are provided or identified by client data. The strategies may be stored in the database. The strategies generated by the strategy module 230 may be derived from associations established or determined by the relational database described earlier. The strategy module 230 is executable by processor 260 to provide one or more strategies to the client on how to measurably progress from the current level to the next level. The progress of a client may be measurable or calculated, such that historical data of the professional growth of a client may be stored in memory 210. Historical data will be discussed later.

The statistics module 240 is executable by processor 260 to provide a statistical measurement of the professional growth of the client within a given time period. The statistics module 240 may obtain data points, data measures, and/or data information from external and internal data resources. For example, the client may provide client information through evaluations or scorecards (such as the exemplary scorecard provided in FIG. 5). Exemplary client information may include subjective scoring of progress made by the client in a current level of professional growth. The statistics module 240 may store this client information or data, and then compare it with similar data received later in time. In some embodiments, the statistics module 240 establishes and compares client information regarding professional growth within a given time period, such as by quarter, by month, and/or by year. Alternatively, the statistics module 240 may determine and compare the client information regarding professional growth between levels that the client has achieved.

The historical overview module 250 is executable by the processor to provide a historical overview of the professional growth of the client, based on the current level of the client and one or more prior levels of professional growth previously reached by the client. The historical overview provided by the historical overview module 250 may be presented visually (such as in a graph, a pie chart, or other graphical means). The historical overview may be provided by the historical overview module 250 in textual form, such as a description of all the levels of professional growth that the client has achieved. Alternatively, the historical overview may comprise a listing of all the statistics stored by the statistics module 240 since the client began the professional growth program. In some exemplary embodiments, the historical overview module 250 may operate via one or more professional growth tools.

Figure 3:
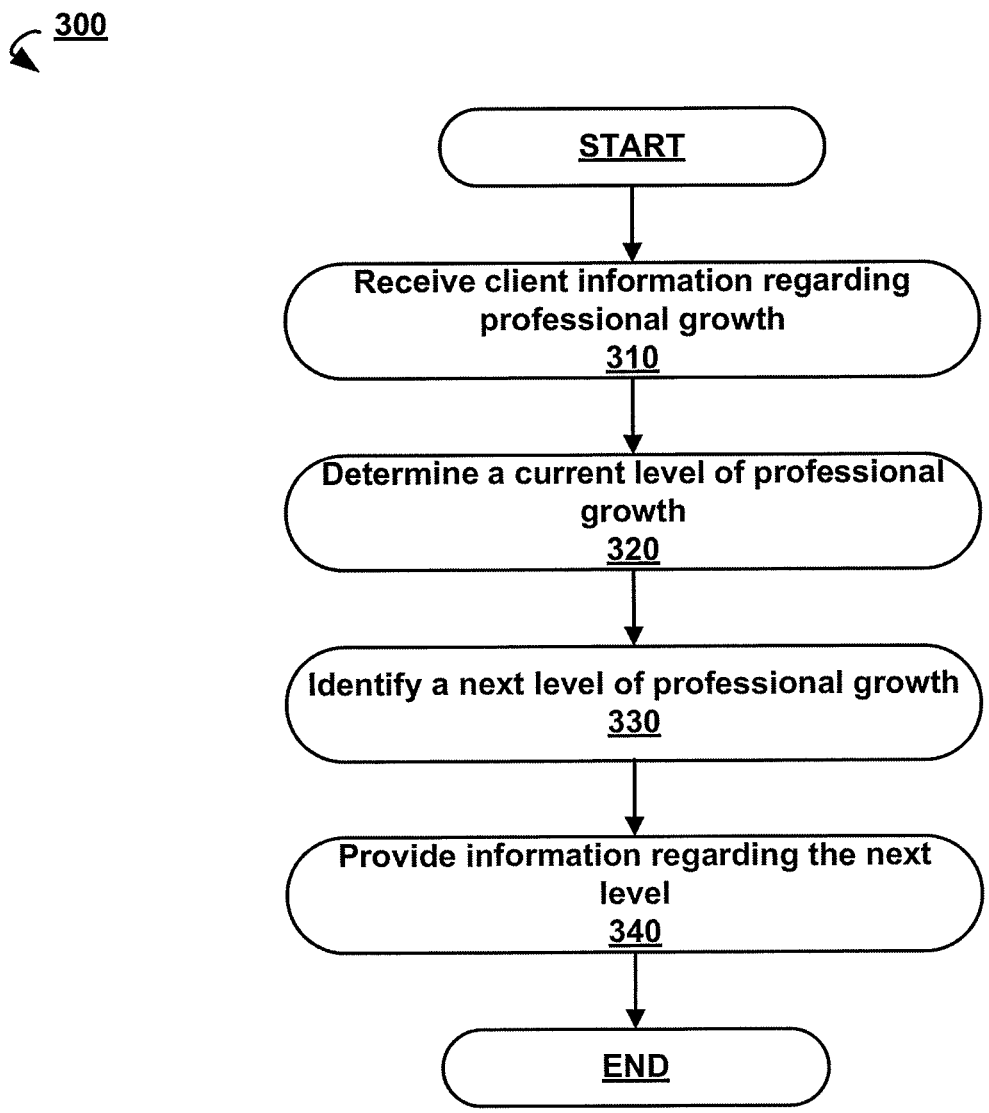
FIG. 3 is a flowchart illustrating an exemplary method for providing information regarding professional growth.

FIG. 3 is a flowchart illustrating an exemplary method 300 for providing information relating to a level of professional growth to the client. In the method 300, client data regarding professional growth of the client is received. The current level of professional growth of the client is determined, and the next level of professional growth is identified. The client is provided with information regarding the next level, based on the identification of the next level.

In step 310, information regarding the professional growth of the client is received. Client 140A may provide any type of information regarding professional growth. An exemplary, non-exhaustive list of such client information includes the goals that the client 140A reached successfully, goals that the client 140A did not reach yet, obstacles that hinder the client 140A, the occupation, how long the client 140A has been in the industry or current occupation, current data regarding the client's work force or team, the types of problems that the client 140A encounters in the profession, self-evaluation of the client 140A as to which level of professional growth the client is at currently, etc. In some instances, client 140A may already be involved in a program for professional development. As such, information regarding client 140A may have been previously provided and the information received in step 310 is an update to the previously provided information. The received client data regarding professional growth of a client may be obtained from any number of external and/or internal data sources, including but not limited to a relational database coupled to the processor. The relational database may include stored client data and associations from data entries as described earlier. The received client data may be obtained from scoring results that are furnished by the client, where the scoring results related to one or more levels of professional growth. An exemplary scorecard is provided in FIG. 5 later herein.

In step 320, a current level of professional growth for the client is determined from the received client data. In other words, the level of professional growth of the client is established based on received client data from one or more data sources. The level of professional growth may be identified with the help of a professional growth ladder, which provides a roadmap of the various levels of professional growth that are available to a client. An exemplary professional growth ladder is provided in FIGS. 4A and 4B. In exemplary embodiments, the current level of professional growth for the client is determined as the level that the client is presently situated on the professional growth ladder, based on a comparison of the client information versus the information provided in the professional growth ladder for each level.

In some exemplary embodiments, if the client information is most closely similar to that provided in level 1 of the professional growth ladder, then it will be determined that the client's current level of professional growth is level 1. The determination may be made by one or more components of the system, such as the processor 260, the relational database (not shown) and one or more modules of the memory 210 (FIG. 2). The determination of the current level may be made using the client information received from one or more professional growth tools, such as the calculators described in U.S. patent application Ser. No. 12/534,783, filed on Aug. 3, 2009, titled "Managing Professional Development," which is hereby incorporated by reference in its entirety. The determination of the current level may be made subjectively (such as with the use of scorecard results obtained from the client) or objectively (such as through a comparative analysis of client information received from a data source versus established details regarding levels presented through a professional growth ladder).

In step 330, the next level of professional growth for the client is identified. In some embodiments, a next level of professional growth is one level higher to the current level. For instance, if the current level of the client is level 1, then the next level of professional growth for the client is level 2. However, the scope of the technology described herein may allow for levels to be repeated or skipped. The current level and the next level may be an update from prior determinations. The determination may be made by one or more components of the system, such as the processor 260, the relational database (not shown) and one or more modules of memory 210 (FIG. 2). The determination of the next level may be made using the client information received from one or more professional growth tools, such as the calculators described in U.S. patent application Ser. No. 12/534,783, filed on Aug. 3, 2009, titled "Managing Professional Development," which is hereby incorporated by reference in its entirety. The determination of the next level may be made subjectively (such as with the use of scorecard results obtained from the client) or objectively (such as through a comparative analysis of client information received from a data source versus established details regarding levels presented through a professional growth ladder).

In step 340, information regarding the next level is provided to the client, based on the identification of the next level in step 330. Step 340 may include providing the client with strategies on how to measurably progress from the current level to the next level. Such strategies may be generated and/or provided by the strategy module 230 (FIG. 2). In some exemplary embodiments, step 340 includes providing to the client one or more professional growth tools. The professional growth tools may be configured to assist the client in obtaining the next level of professional growth. The professional growth tools may be interactive, and they may be accessed online via the Internet on a website. The professional growth tools may include the calculators described in U.S. patent application Ser. No. 12/534,783, filed on Aug. 3, 2009, titled "Managing Professional Development," which is hereby incorporated by reference in its entirety. A calculator may be configured to measure current client data relating to the professional growth of a client. It should be noted that an exemplary, non-exhaustive list of professional growth tools was previously provided herein. The professional growth tool may include an evaluation of the professional growth of the client based on current statistics supplied by the client.

The method 300 may also include maintaining a historical overview of the professional growth of the client, based on the current level of the client and one or more prior levels of professional growth previously reached by the client. The historical overview may be provided by the historical overview module 250 (FIG. 2). Further information of historical overviews has already been provided earlier.

The method 300 may optionally provide the client a statistical measurement of the professional growth of the client within a given time period. The statistical measurement may be any type of statistical data taken from a statistical analysis of professional growth. The statistics module 240 (FIG. 2) may generate the statistical measurement.

FIGS. 4A and 4B depict an exemplary professional growth ladder 400 that provides information regarding professional growth to systems and methods described herein. In some embodiments, the professional growth ladder 400 may be considered a dashboard of the personal growth tools, online resources, the coaching mechanisms, and the training materials that the client needs in order to experience professional growth. The exemplary professional growth ladder 400 includes seven levels, with level 1 being the lowest level and level 7 being the highest level of increased value creation. It will be understood that the illustration is exemplary only and the professional growth ladder 400 may include any number of levels. Each level includes information in several columns, including information regarding the level designation 410, a result of the level 420, a name of the level 430, a summary of the level 440, strengths of the level 450, dangers of the level 460, and opportunities of the level 470. The characteristics of each level are provided in the designated row. For instance, in level 1, the row 480 provides such information as the result of being in level 1 ("captivity)" and the name of level 1 ("Commodity Trap Company"). The summary of level 1, the strengths, the dangers, and the opportunities of level 1 are also provided in row 480 of the exemplary professional growth ladder 400.

In some embodiments, the professional growth ladder 400 is utilized by methods and systems described herein, in order to determine the current level and the next level for the client's professional growth. The professional growth ladder 400 may be stored in memory 210 (FIG. 2). The professional growth ladder may be used in conjunction with any of the modules stored in memory 210. For instance, the professional growth ladder may be helpful to generate strategies by the strategy module 230 and/or to provide professional growth tools by the professional growth tools module.

FIG. 5 is an exemplary scorecard 500 by which a client may be scored on professional growth. The exemplary scorecard 500 may be provided to the client through the network 110. The scorecard 500 may include a listing of all the levels. In the exemplary scorecard 500, the same seven levels from the professional growth ladder 400 (FIGS. 4A and 4B) are provided, but any number of levels may be provided in the scorecard. Like the professional growth ladder 400 (FIGS. 4A and 4B), the characteristics of each level are provided in the designated row for the level. For instance, in level 1, the row 510 provides such information as the name of level 1 ("Commodity Trap Company") and the description of level 1 ("You continually break through your Ceiling of Complexity—and escape from commoditization—by increasing your personal and organization productivity and profitability.")

The exemplary row 510 may have columns for scoring and for further client information input. The scoring scale is from 1-10, 1 being the lowest and 10 being the highest. Thus, the client may score or evaluate where they are at in a given level using the scoring scale. Also, client information input may be sought in the "What's Working?" (that is, what is helping the client in professional growth) and "What's Not?"(what is not helping the client) columns provided in the scorecard 500. Finally, the column "Progress: Next 90 Days" may allow for the client to input what are the measurable progressive steps are necessary for the client to reach in the next 90 days. It will be appreciated by one skilled in the art that all the figures provided herein, including FIG. 5, are exemplary. For instance, any number and type of rows, columns, and/or client input mechanisms may be provided in the scorecard 500. A score box that provides the total score may be provided in the scorecard 500.

FIGS. 6-10 are exemplary screenshots from a website that includes some embodiments of this technology. In some embodiments, the website is coupled to a software program. The software program may be configured to interact with a client through a computerized device (such as the computerized device provided in FIG. 11 and described later herein).

Figure 6:
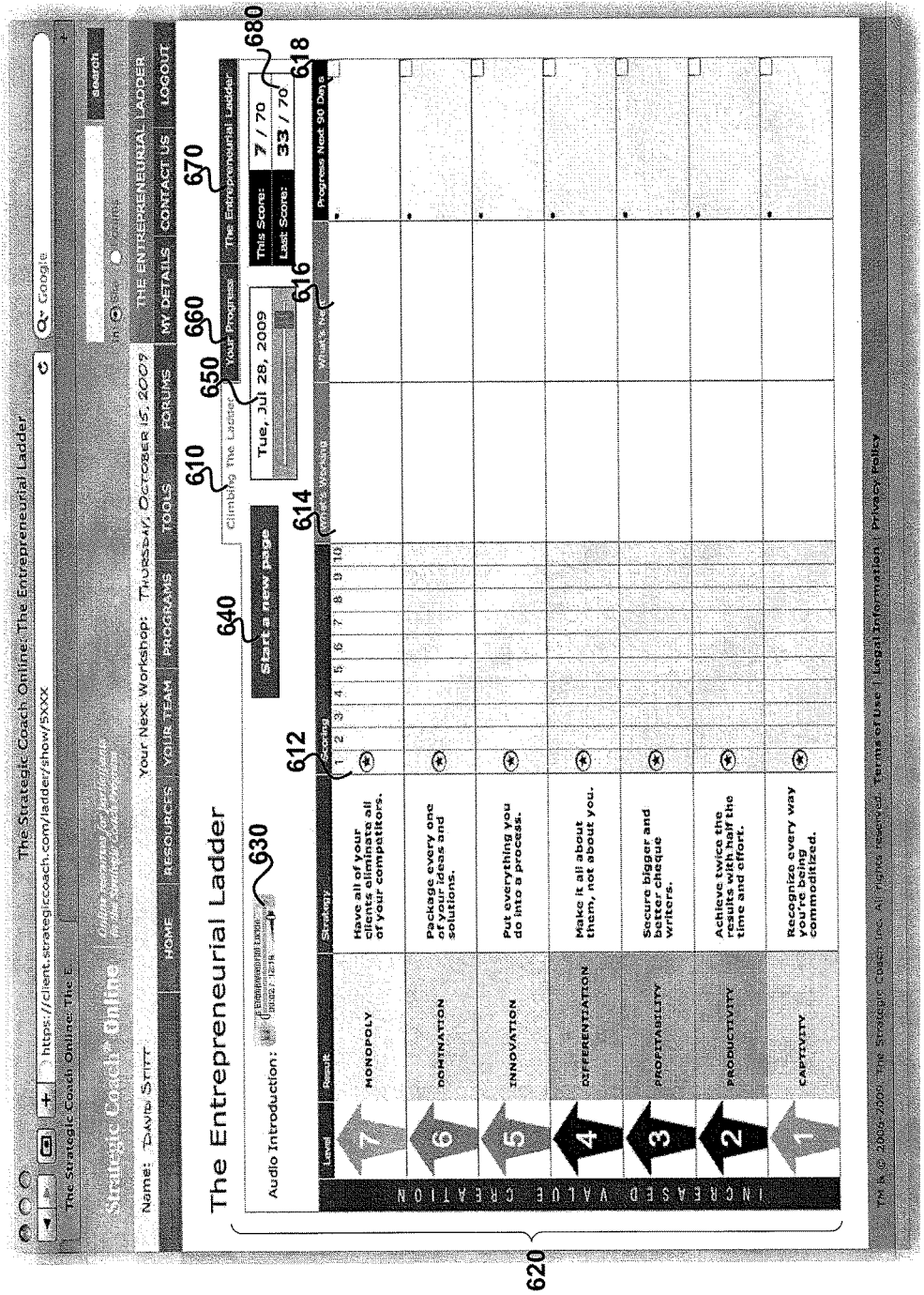

FIG. 6 depicts an exemplary screenshot 600 of a website as shown on a display via a web browser that is associated with a computerized device. The screenshot 600 is associated with a "Climbing The Ladder" tab 610. The screenshot 600 may further include a number of components, such as a score sheet 620, an audio introduction that may be streamed online 630, a start button 640, a date slider 650, a plurality of tabs (such as "Your Progress" tab 660 and "The Entrepreneurial Ladder" tab 670), and a score display 680.

In one embodiment, the screenshot 600 may be provided to the client when the software program is first loaded. In further embodiments, the screenshot 600 may be displayed to the client after the client clicks the "Climbing The Ladder" tab 610 or after the client clicks on the start button 640 (which is shown as the button that states "Start a new page").

This screenshot 600 may be presented for the client to provide client data in various fields in the score sheet 620. The client may provide scoring data on any given day. In the exemplary screenshot 600, the date slider 650 shows that the current date is Jul. 28, 2009. The date slider 650 may be used to slide or otherwise jump to another calendar date, so that the client may be provided the scoring on any given date.

The client may provide client data on the score sheet 620 in order to score or otherwise rate a user on seven levels. The levels, associated results, and associated strategies are presented to the client in the score sheet 620. For instance, in the score sheet 620 as presented in the exemplary screenshot 600, on Jul. 28, 2009, the client has provided client data showing that the user scored himself a "1" on a scale of 1-10 in each of the scoring fields. For instance, the user has scored himself a "1" in a scoring field 612 for Level 7. The processor (not shown) totals up the scores provided by the client through the score sheet 620 in order to obtain a total score for the client for a given day. Thus, since the client provided client data in the form of a score of a "1" on 7 levels, the score display 680 shows that today's score (which is depicted as "This Score:") is 7/70. The client's last score was "33/70," which means that the client previously provided client data in the form of scores that were higher on one or more levels of the score sheet 620. The client may also input further client data, such as notes. For instance, the client may provide user input data in the "What's Working" field 614 to provide information on what is helping the user in professional growth. In the "What's Next" field 616, the client may provide input data as to what issues, matters or problems that the user would like to address. The client may provide what progress the user would like to make in the next 90 days in a "Progress Next 90 days" field 618 associated with a level. In FIG. 6, the "What's Working" field 614, the "What's Next" field 616, and the "Progress Next 90 days" field 618 associated with a level are empty.

Figure 7:
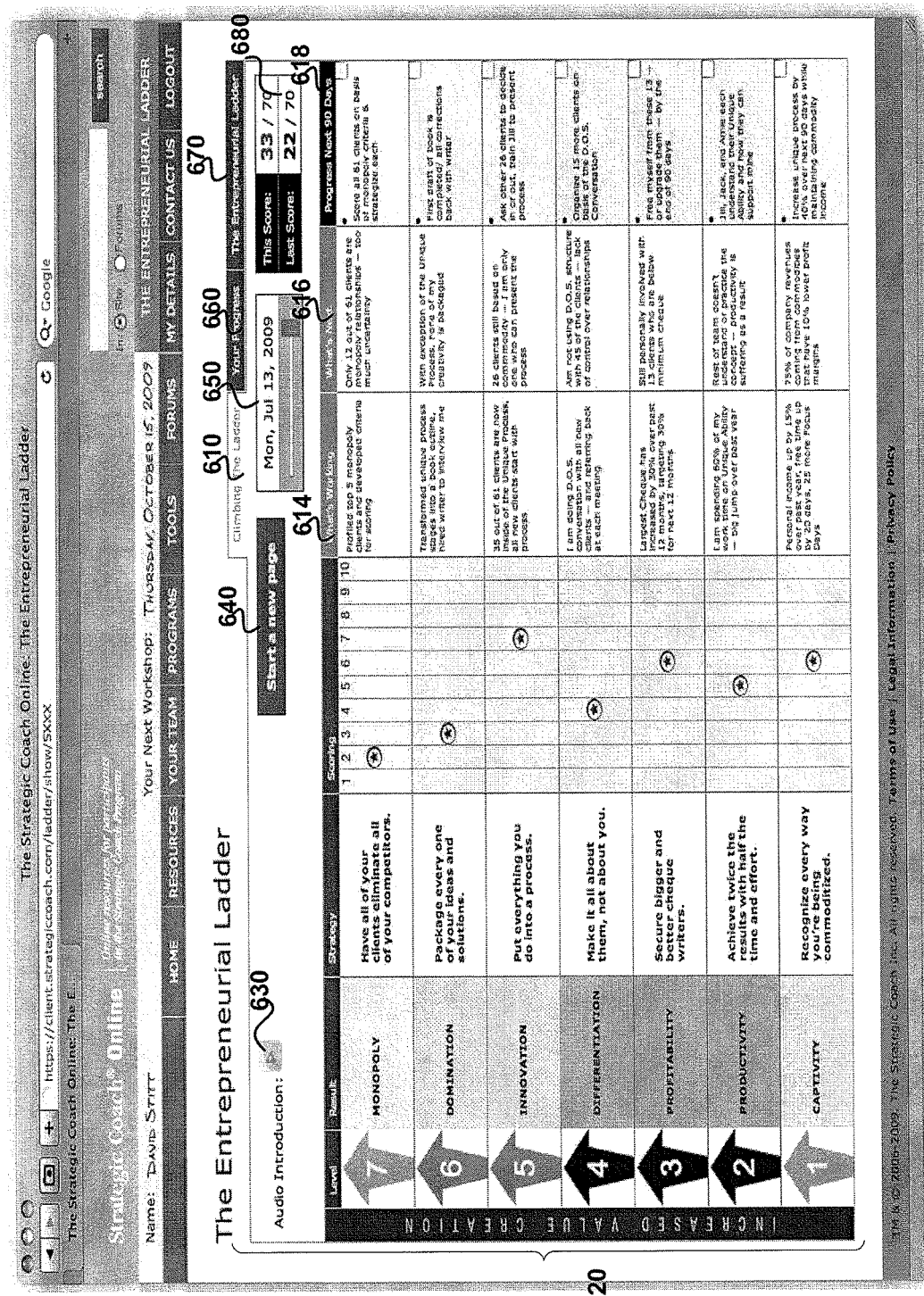

FIG. 7 provides an exemplary screenshot 700 in accordance with various embodiments. The screenshot 700 depicts a score sheet 720 somewhat similar to that shown in the screenshot 600 (FIG. 6), but with some notable differences. In the screenshot 720, client data from the client has been inputted in the "What's Working" field 614, the "What's Next" field 616, and the "Progress Next 90 days" field 618.

As shown on the score sheet 720, Level 7 has an associated result of "Monopoly" and an associated strategy of "Have all of your clients eliminate all of your competitors." The client has provided client data showing a scoring of a "2" on the scoring scale of 1-10 for Level 7. The score sheet 720 also indicates that the client has provided client data for the "What's Working" field 614 indicating that user has "[p]rofiled top 5 monopoly clients and developed criteria for scoring." The client has also provided client data for the "What's Next" field 616, indicating that "[o]nly 12 out of 61 clients are monopoly relationships—too much uncertainty."

For the "Progress Next 90 Days" field 618, according to various embodiments, the client may provide client data in the form of upcoming strategies for the anticipated or planned progress in the next 90 days. In various embodiments, the software program itself may determine or otherwise develop the upcoming strategies for the progress to be made in the next 90 days based on the client data and strategies already programmed with the software program. As shown in FIG. 7, the "Progress Next 90 Days" field for Level 7 shows that the progress is to "[s]core all 61 clients on basis of monopoly criteria & strategize each."

Figure 8:
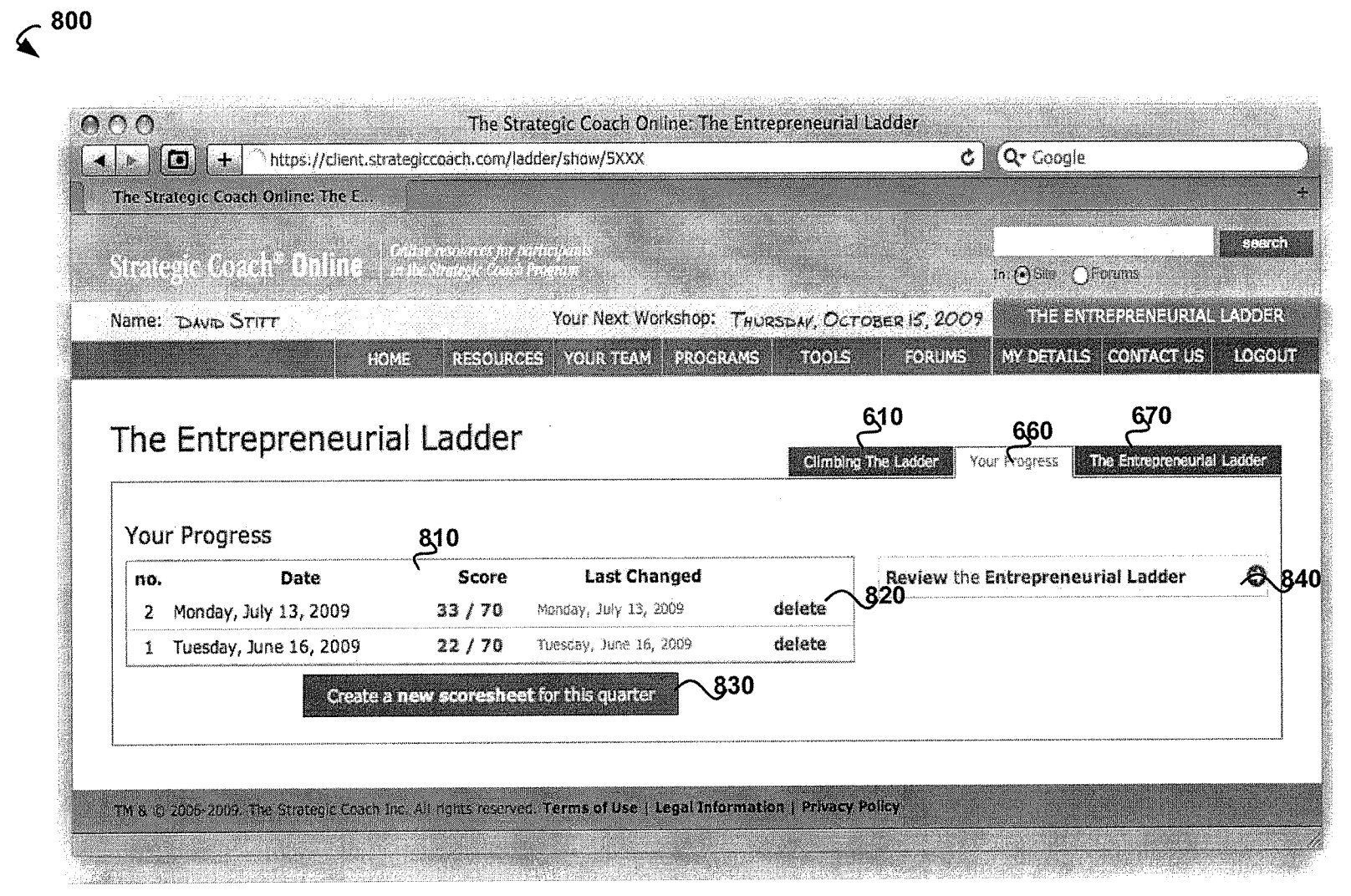

FIG. 8 is an exemplary screenshot 800 associated with the "Your Progress" tab. The screenshot 800 shows what is depicted after a score sheet associated with the "Climbing the Ladder" tab 610 has been scored by the software program. Alternatively, the screenshot 800 shows what is depicted after the "Your Progress" tab 660 is selected by the client. In the example provided in FIG. 8, the screenshot 800 shows a summary of the score sheets 810 of the client. FIG. 8 shows that in this example, on Jun. 16, 2009, the client has provided client data including a scoring of a 22/70 based on the score sheet for that given day. The screenshot 800 also shows that on Jul. 13, 2009, the client data provided a scoring of 33/70 based on the score sheet on that given day. The screenshot 800 shows when the score sheets were last changed. The summary of score sheets presented in the screenshot 800 allow for one or more score sheets to be deleted by a user selecting a delete button 820. The screenshot 800 further includes a create score sheet button 830 and a review button 840. If a client selects the create score sheet button 830, then a new score sheet is displayed to the user, such as the exemplary score sheet 620 as provided in FIG. 6. If the review button 840 is selected, then the client is provided with a screenshot of the entrepreneurial ladder. Exemplary screenshots of the entrepreneurial ladder are provided in FIGS. 9 and 10.

Figure 9:
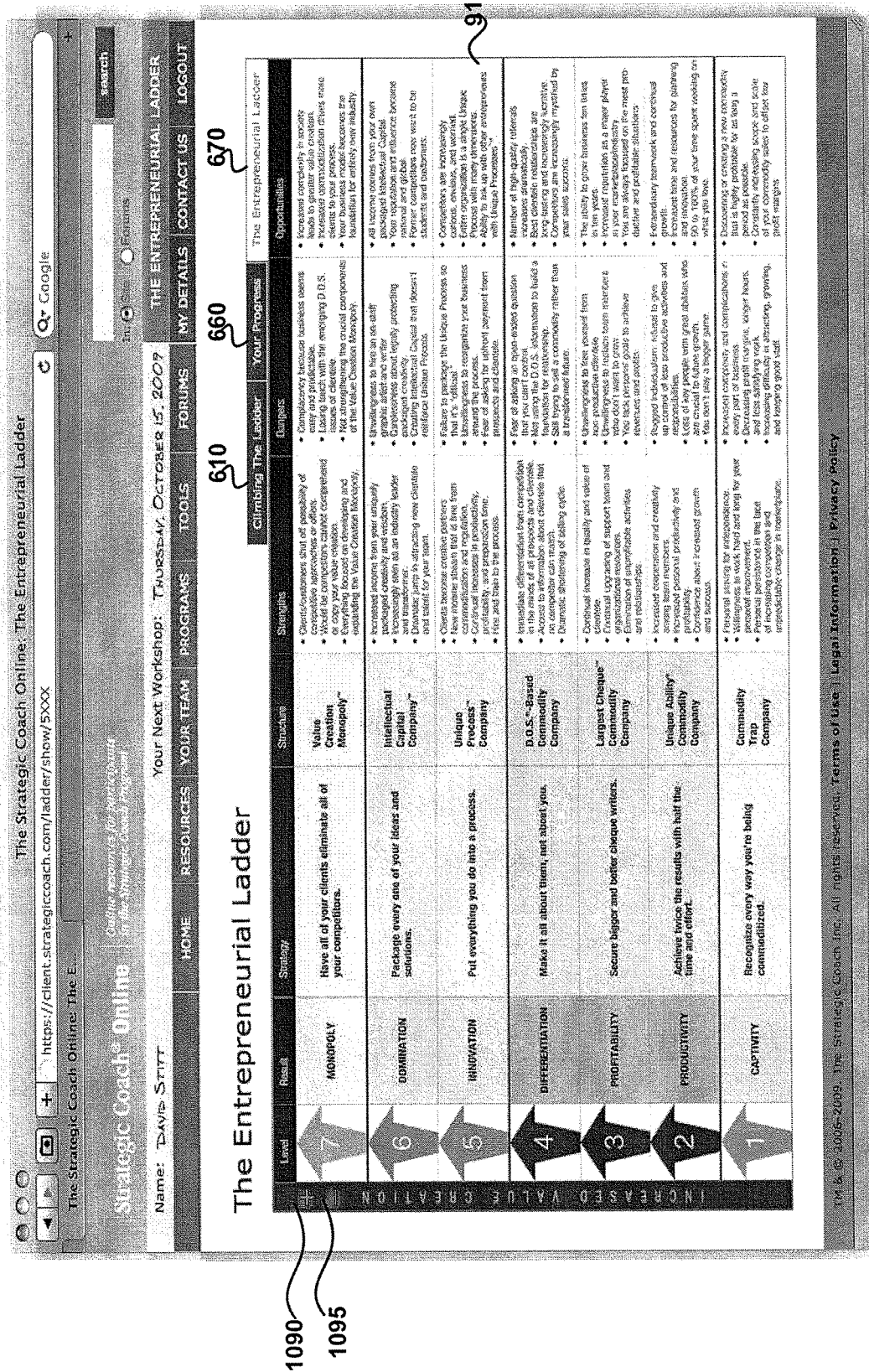

FIG. 9 shows an exemplary screenshot 900 of what is depicted if "The Entrepreneurial Ladder" tab 670 is selected by the client. The screenshot 900 presents an exemplary entrepreneurial ladder having seven levels with associated results, strategies, structures, strengths, dangers and opportunities for each of the levels. The screenshot 900 of the exemplary entrepreneurial ladder is a guide or a map for a client regarding professional growth.

Figure 10:
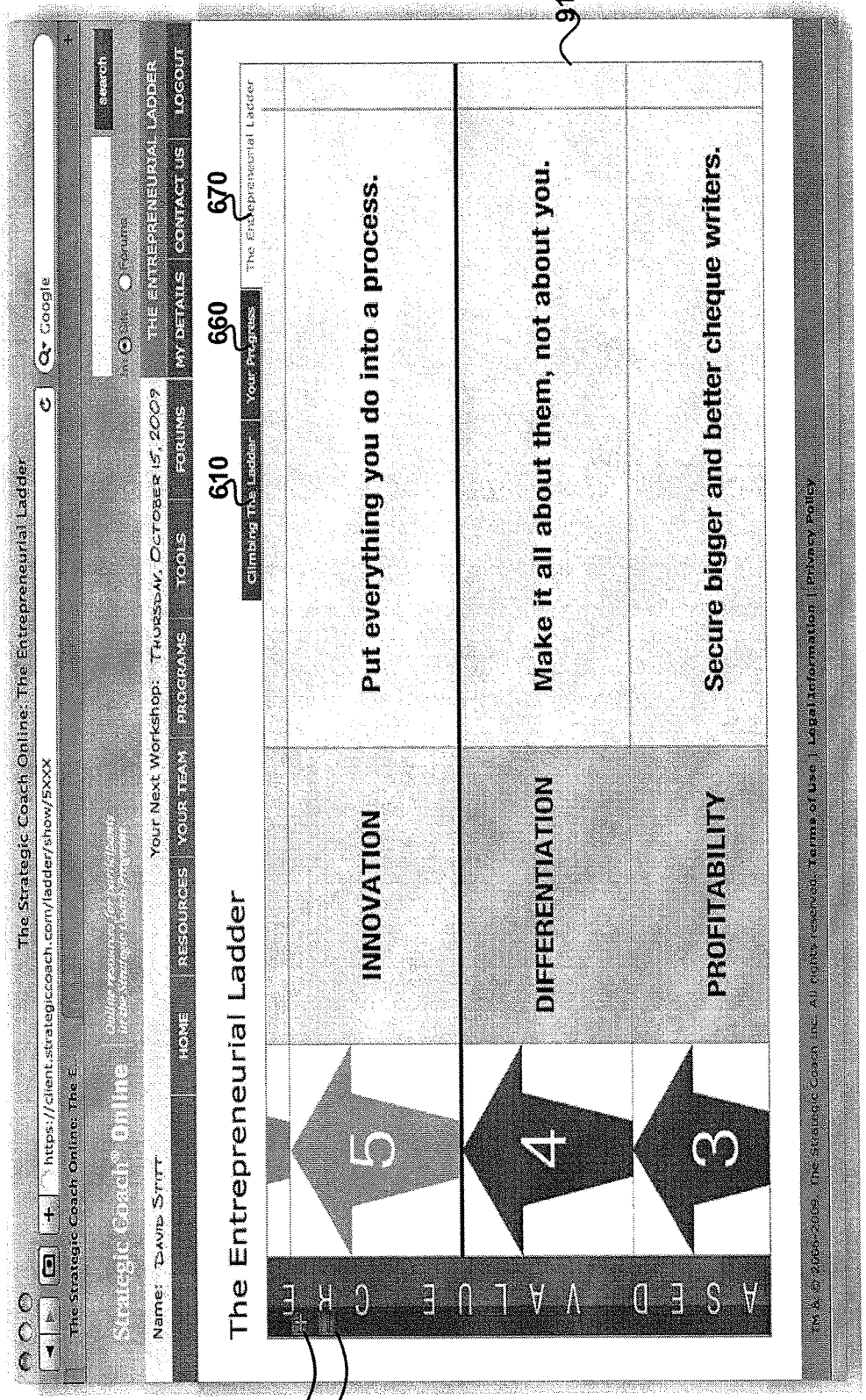

FIG. 10 shows an exemplary screenshot 1000 of a zoomed-in portion of the screenshot 900 in FIG. 9. Any screenshot provided herein may be zoomed-in or zoomed-out via a clickable zoom-in button 1090 (shown as a button labeled with a plus '+' sign) and a clickable zoom-out button 1095 (shown as a button labeled with a minus '−' sign).

Figure 11:
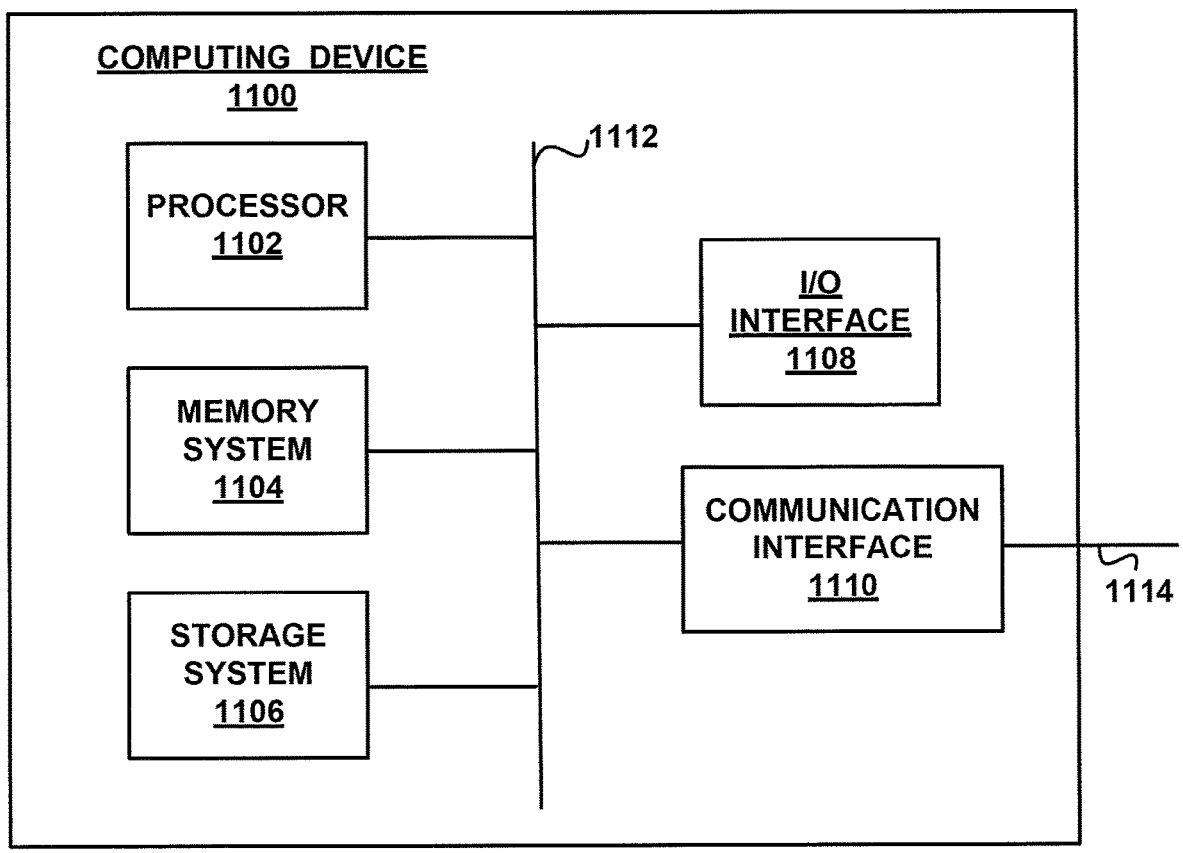
FIG. 11 depicts a computing device according to various embodiments.

FIG. 11 depicts a computing device 1100 according to various embodiments. The computing device 1100 comprises a processor 1102, a memory system 1104, a storage system 1106, an input/output (I/O) interface 1108, and a communication interface 1110, which are all coupled to a system bus 1112. Like processor 260 (FIG. 2), processor 1102 is configured to execute executable instructions. In some embodiments, the processor 1102 comprises circuitry or any processor capable of processing the executable instructions.

The memory system 1104 is any memory configured to store data. Some examples of the memory system 1104 are storage devices, such as RAM or ROM. The storage system 1106 is any storage configured to retrieve and store data. Some examples of the storage system 1106 are flash drives, hard drives, optical drives, and/or magnetic tape. The storage system 1106 may comprise a data structure configured to hold and organize data.

The I/O interface 1108 is any device that may receive data from a client or provide data to the client. The I/O interface 1108 may include, but is not limited to, a keyboard, a monitor, a mouse, a speaker, a microphone, or a camera.

The communication interface 1110 may be coupled to any digital device via the link 1114. The communication interface 1110 may support communication over a USB connection, a firewire connection, an Ethernet connection, a serial connection, a parallel connection, or an ATA connection. The communication interface 1110 may also support wireless communication (e.g., 802.11 a/b/g/n or wireless USB). It will be apparent to those skilled in the art that the communication interface 1110 can support many wired and wireless standards.

Some of the above-described functions can be composed of instructions that are stored on storage media (e.g., computer-readable medium). The instructions may be retrieved and executed by the processor 1102. Some examples of storage media are memory devices, tapes, disks, integrated circuits, and servers. The instructions are operational when executed by the processor 1102 to direct the processor 1102 to operate in accord with the invention. Those skilled in the art are familiar with instructions, processor(s), and storage media.

It is noteworthy that any hardware platform suitable for performing the processing described herein is suitable for use with the invention. The terms "computer-readable medium" and "computer-readable media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for assisting a client in reaching a level of professional growth, the method comprising:
   obtaining, by a relational database, data entries regarding a client, from two or more data sources;
   determining, by the relational database, both explicit and implicit associations from the data entries;
   receiving client data from the client and the relational database, the client data comprising the explicit and implicit associations that were determined by the relational database, among the data entries, regarding professional growth of the client;
   executing, by a computer, instructions stored in memory, wherein execution of the instructions by a processor:
      determines a current score for each level of a plurality of levels of professional growth of the client, based on the received client data, the plurality of levels of professional growth including monopoly, domination, innovation, differentiation, profitability, productivity, and captivity,
      the current score for monopoly based on a number of customers of the client that have eliminated competitors of the client,
      the current score for domination based on a number of unique processes,
      the current score for innovation based on a number of customers of the client using one or more unique processes of a user,
      the current score for differentiation based on frequency of client use of Dangers-Opportunities-Strengths (D.O.S.) analysis with customers,
      the current score for profitability based on a largest check calculation to identify profitability of professional tasks,
      the current score for productivity based on focus day calculations, and
      the current score for captivity based on decrease in commoditization of products; and
      identifies a current level and a next level of professional growth for the client, the established details for each level including:
      a summary of the level,
      strengths of the level,
      dangers of the level, and
      opportunities of the level;
   generating, by the computer, a user interface that includes a graphical representation of professional growth levels, obstacles, strengths, weaknesses, and results;
   receiving, from the user interface, input including a user selection of at least one of the professional growth levels, obstacles, strengths, weaknesses, and results, the input corresponding to professional growth;
   generating, by the computer, one or more custom-tailored strategies based on the user selection of at least one of the professional growth levels, obstacles, strengths, weaknesses, and results, the custom-tailored strategies further derived from the explicit and implicit associations from the data entries as determined by the relational database and from strategies pre-programmed in the processor;
   generating, by the computer, in the user interface, a graphical representation of the custom-tailored strategies including the user selection of the at least one of the professional growth levels, obstacles, strengths, weaknesses, and results;
   executing, by the computer, instructions stored in memory, wherein execution of the instructions by an interactive professional growth tool module:
      generates a plurality of interactive professional growth tools using one or more templates and training materials stored in the relational database, each of the plurality of levels of professional growth associated with at least one of the plurality of interactive professional growth tools, and identifies which of the available interactive professional growth tools associated with the current level of professional growth should be provided to the client, based on the determination of the current level;

providing to the client online access via the Internet to a first identified interactive professional growth tool for use by the client in achieving the next level of professional growth, the provided first interactive professional growth tool including:

the one or more templates and training materials stored in the relational database, and at least one of a focus day calculator, intellectual capital calculator, entrepreneur time calculator, and largest check calculator, the at least one calculator configured to:

calculate client progress in achieving the next level of professional growth using current statistics supplied by the client, the statistics representing at least one statistical measurement of the professional growth of the client within a given time period, and communicate a recommendation to the client concerning a next step in achieving the next level of professional growth, the recommendation based on the calculated client progress;

receiving updated client data of professional growth from the client;

dynamically identifying a second interactive professional growth tool based on the received updated client data;

providing to the client access to the second interactive professional growth tool;

tracking and enforcing the client's interaction with one or more interactive professional growth tools before the client may advance to the next level of professional growth;

updating, by the computer, the explicit and implicit associations from the data entries by the relational database based on the updated client data; and updating, by the computer, in the user interface, the graphical representation of the custom-tailored strategies based on the updated client data and the updated explicit and implicit associations determined by the relational database.

2. The method of claim 1, wherein providing the client with information regarding each of the plurality of levels of professional growth further comprises providing the client with strategies on how to measurably progress from the current level to the next level, the progress being measured or calculated to generate historical data of the professional growth of the client, and wherein the next level is for the same job description as the current level.

3. The method of claim 2, further comprising generating a historical overview of the professional growth of the client based on the current level of the client and one or more prior levels of professional growth previously reached by the client.

4. The method of claim 1, further comprising assisting the client in obtaining the next level of professional growth using the provided interactive professional growth tool.

5. The method of claim 4, further comprising measuring current client data relating to the professional growth of the client using a calculator included in the provided interactive professional growth tool.

6. The method of claim 1, wherein receiving client data regarding professional growth of a client further comprises receiving client data regarding professional growth of the client from a relational database coupled to the processor.

7. The method of claim 1, wherein receiving client data regarding professional growth of a client further comprises receiving client data regarding professional growth of the client obtained from scoring results that are furnished by the client, the scoring results relating to one or more levels of professional growth.

8. The method of claim 1, further comprising providing the client a growth ladder display including the plurality of levels of professional growth available to the client wherein the growth ladder display of each of the levels comprises:

a result of achieving the current level,
a name of the current level,
a summary description of features of the current level,
one or more strengths of the current level,
one or more dangers of the current level, and
one or more opportunities of the current level.

9. The method of claim 8, wherein the growth ladder display of the next level further comprises:

a result of achieving the next level,
a name of the next level,
a summary description of features of the next level,
one or more strengths of the next level,
one or more dangers of the next level, and
one or more opportunities of the next level.

10. The method of claim 1, further comprising maintaining a historical overview of the professional growth of the client, based on the current level of the client and one or more prior levels of professional growth previously reached by the client.

11. The method of claim 1, further comprising providing the client with a statistical measurement of the professional growth of the client within a given time period.

12. The method of claim 1, wherein the first interactive professional growth tool is a calculator and the second interactive professional growth tool is the calculator with enhanced features for a more robust utility.

13. The method of claim 1, wherein the first interactive professional growth tool is a focus day calculator and the second interactive professional growth tool is the focus day calculator combined with customized coaching strategies in view of the client's obstacles that were provided by the updated client data.

14. A system for providing information regarding professional growth, the system comprising:

a relational database configured to:
obtain data entries regarding a client, from two or more data sources;
determine both explicit and implicit associations from the data entries;
store client data regarding professional growth of the client, the client data comprising the explicit and implicit associations that were determined by the relational database among the data entries; and
update the explicit and implicit associations from the data entries based on updated client data;

a processor coupled to the relational database and configured to execute, by a computer, instructions stored in memory to:
determine a current score for each level of a plurality of levels of professional growth of the client, based on the received client data, the plurality of levels of professional growth including monopoly, domination, innovation, differentiation, profitability, productivity, and captivity, the monopoly level based on a number of customers of the client that have eliminated competitors of the client, the domination level based on a number of unique processes, the innovation level based on a number of customers of the client using one or more unique processes of a user, the differentiation level based on frequency of client use of Dangers-Opportunities-Strengths (D.O.S.) analysis with a client, the profitability level based on a largest check calculation, and the productivity based on focus day calculations, the captivity level based on decrease in commoditization of products;

identify a current level of professional growth for the client, based on the received client data;

develop upcoming strategies for progress to be made for each of the levels of professional growth, based on the client data; and identify a next level of professional growth for the client, based on the determination of the current score;

a professional growth tool module configured to:
  generate, by the computer, a plurality of professional growth tools using one or more templates and training materials stored in the relational database, each of the plurality of levels of professional growth associated with at least one of the plurality of professional growth tools; and
  identify which of the available professional growth tools associated with the current level of professional growth should be provided to the client, based on the determination of the current level of professional growth;

a strategy module configured to:
  derive one or more custom-tailored strategies from the explicit and implicit associations in the relational database on how to measurably progress from the current level to the next level;
  generate, by the computer, the custom-tailored strategies based on a user selection of at least one of the professional growth levels, obstacles, strengths, weaknesses, and results, the custom-tailored strategies further derived from the explicit and implicit associations from the data entries as determined by the relational database and from strategies pre-programmed in the processor;
  provide the one or more custom-tailored strategies to the client; and
  generate, by the computer, a recommendation for each level of the plurality of levels of professional growth using a largest check calculator, the recommendation indicating a range of tasks upon which to focus;

an interface module configured to provide the client with information regarding each of the plurality of levels of professional growth, based on the score and client data input for each of the plurality of levels of professional growth, the interface module further configured to:
  generate, by the computer, a user interface that includes a graphical representation of professional growth levels, obstacles, strengths, weaknesses, and results;
  receive, from the user interface, input including the user selection of the at least one of the professional growth levels, obstacles, strengths, weaknesses, and results, the input corresponding to professional growth;
  generate, by the computer, in the user interface, a graphical representation of the custom-tailored strategies including the user selection of the at least one of the professional growth levels, obstacles, strengths, weaknesses, and results; and update, by the computer, in the user interface, the graphical representation of the custom-tailored strategies based on the updated client data and the updated explicit and implicit associations determined by the relational database; and a statistical module configured to provide the client with a statistical measurement of the client's professional growth based on the current level of professional growth of the client and one or more prior levels of professional growth that were obtained by the client;

the professional growth tool module configured to provide to the client the first identified professional growth tool associated with the current score for each level of the plurality of levels of professional growth, the first provided professional growth tool including templates and training materials stored in the relational database, the first provided professional growth tool configured to perform an evaluation of the professional growth of the client based on current statistics supplied by the client, the statistics representing at least one statistical measurement of the professional growth of the client within a given time period, the professional growth tool module further configured to receive updated client data of professional growth from the client, dynamically identify a second interactive professional growth tool based on the received updated client data, provide to the client access to the second interactive professional growth tool, track and enforce the client's interaction with one or more professional growth tools before the client may advance to the next level of professional growth.

15. The system of claim 14, further comprising a historical overview module stored in memory and executable by the processor to provide a historical overview of the professional growth of the client, based on the current level of the client and one or more prior levels of professional growth previously reached by the client.

16. The system of claim 14, wherein the strategy module is further configured to provide one or more strategies to the client on how to measurably progress from the current level to the next level.

17. The system of claim 14, further comprising:
  an intellectual capital calculator to classify the unique processes and calculate a proportion of income derived from each of the unique processes;
  a focus day calculator to determine a projected income for a day dedicated to performance of each professional task and a number of days dedicated to performance of professional tasks that will achieve a desired income level, for generating focus day calculations; and
  an entrepreneur calculator to determine a number of days dedicated to performance of the professional tasks (dedicated days) and non-dedicated days, the non-dedicated days including free days and preparation days, the preparation days for preparing for dedicated days or free days, for generating a schedule that will generate projected income for the dedicated days,
  wherein the largest check calculator is further configured to identify profitability of tasks, calculate an income baseline from the profitability, and identify professional tasks for focus to increase profitability above the income baseline for generating a largest check.

18. A non-transitory computer-readable storage medium having embodied thereon a program, the program executable by a processor to perform a method for managing professional development, the method comprising:

obtaining, by a relational database, data entries regarding a client, from two or more data sources;

determining, by the relational database, both explicit and implicit associations from the data entries;

receiving client data regarding professional growth of a client from the client and the relational database, the client data comprising the explicit and implicit associations that were determined by the relational database, among the data entries, regarding professional growth of the client;

determining a current score for each level of a plurality of levels of professional growth of the client, based on the received client data, the plurality of levels of professional growth including monopoly, domination, innovation, differentiation, profitability, productivity, and captivity, the current score for monopoly based on a number of customers of the client that have eliminated competitors of the client, the current score for domination based on a number of unique processes, the current score for innovation based on a number of customers of the client using one or more unique processes of a user, the current score for differentiation based on frequency of client use of Dangers-Opportunities-Strengths (D.O.S.) analysis with customers, the current score for profitability based on a largest check calculation to identify profitability of professional tasks, the current score for productivity based on focus day calculations, and the current score for captivity based on decrease in commoditization of products;

developing upcoming strategies for progress to be made for each of the levels of professional growth, based on the client data;

generating by a computer, a user interface that includes a graphical representation of professional growth levels, obstacles, strengths, weaknesses, and results;

receiving, from the user interface, input including a user selection of at least one of the professional growth levels, obstacles, strengths, weaknesses, and results, the input corresponding to professional growth;

generating, by the computer, one or more custom-tailored strategies based on the user selection of at least one of the professional growth levels, obstacles, strengths, weaknesses, and results, the custom-tailored strategies further derived from the explicit and implicit associations from the data entries as determined by the relational database and from strategies pre-programmed in the processor;

generating, by the computer, in the user interface, a graphical representation of the custom-tailored strategies including the user selection of the at least one of the professional growth levels, obstacles, strengths, weaknesses, and results;

identifying a next level of professional growth for the client, based on the determination of the current score;

generating, by the computer, a plurality of professional growth tools using one or more templates and training materials stored in the relational database;

associating each level of professional growth with at least one of the generated professional growth tools;

deriving one or more strategies from the explicit and implicit associations in the relational database on how to measurably progress from the current level to the next level;

providing the one or more derived strategies to the client;

providing the client with information regarding each of the plurality of levels of professional growth, based on the score and client data input for each of the plurality of levels of professional growth;

generating, by the computer, a recommendation for each level of the plurality of levels using a largest check calculator, the recommendation indicating a range of tasks upon which to focus;

providing to the client an interactive professional growth tool configured to perform an evaluation of the professional growth of the client based on the derived strategies and current statistics supplied by the client, the identified professional growth tool associated with the current scores for each level of the plurality of levels of professional growth, the provided professional growth tool including templates and training materials stored in the relational database, the provided professional growth tool configured to perform an evaluation of the professional growth of the client based on current statistics supplied by the client, the statistics representing at least one statistical measurement of the professional growth of the client within a given time period;

receiving updated client data of professional growth from the client;

dynamically identifying a second interactive professional growth tool based on the received updated client data;

providing to the client access to the second interactive professional growth tool;

tracking and enforcing the client's interaction with the one or more professional growth tools before the client may advance to the next level of professional growth;

updating, by the computer, the explicit and implicit associations from the data entries by the relational database based on the updated client data; and updating, by the computer, in the user interface, the graphical representation of the custom-tailored strategies based on the updated client data and the updated explicit and implicit associations determined by the relational database.

19. A method comprising:

obtaining, by a relational database, data entries regarding a client, from two or more data sources;

determining, by the relational database, both explicit and implicit associations from the data entries;

receiving client data from the client and a relational database, the relational database coupled to a processor, the client data comprising the explicit and implicit associations that were determined by the relational database, among the data entries, regarding professional growth of the client;

executing, by a computer, instructions stored in memory, wherein execution of the instructions by the processor:

determines a current score for each level of a plurality of levels of professional growth of the client, based on the received client data;

provides the client a graphical user interface depicting a growth ladder display, the growth ladder display including the plurality of levels of professional growth available to the client wherein the growth ladder display of each of the levels comprises:

a result of achieving the current level, a name of the current level, a summary description of features of the current level, one or more strengths of the current level, one or more dangers of the current level, and one or more opportunities of the current level;

determines a current level and next level of professional growth for the client and updating, by the computer, the graphical user interface to include a graphical representation of the current level and next level of professional growth for the client as determined by a comparative analysis, the graphical representation further including obstacles, strengths, weaknesses, and results;

receiving, via the graphical user interface, client input including a user selection of at least one of the current level and the next level of professional growth, obstacles, strengths, weaknesses, and results, the client input corresponding to professional growth;

based on the received user selection of the at least one of the professional growth levels, obstacles, strengths, weaknesses, and results, generating, by the computer, one or more custom-tailored strategies derived from the explicit and implicit associations from the data entries as determined by the relational database and from strategies pre-programmed in the processor;

enhancing, by the computer, the graphical user interface, the enhancing including generation of a graphical representation of the custom-tailored strategies that are derived from the explicit and implicit associations from the data entries as determined by the relational database and from the strategies pre-programmed in the processor;

updating, by the computer, the explicit and implicit associations from the data entries by the relational database based on updated client data; and updating, by the computer, in the user interface, the graphical representation of the custom-tailored strategies based on the updated client data and the updated explicit and implicit associations determined by the relational database.

20. The method of claim 19, wherein the relational database is further configured to identify obstacles based on the client data.

21. The method of claim 20, wherein the custom-tailored strategies are further customized to address the obstacles identified by the relational database.

* * * * *